United States Patent

[11] 3,596,279

| [72] | Inventor | Taisuke Uchiyama<br>Tokyo, Japan |
| --- | --- | --- |
| [21] | Appl. No. | 810,731 |
| [22] | Filed | Mar. 26, 1969 |
| [45] | Patented | July 27, 1971 |
| [73] | Assignee | Kabushiki Kaisha Daiki Sersakusho<br>Neyagawa, Osaka Pref, Japan |
| [32] | Priority | Mar. 28, 1968 |
| [33] | | Japan |
| [31] | | 43/19722 |

[54] SPEED RECORDER OF VOLTMETER TYPE FOR MOTOR VEHICLES
2 Claims, 3 Drawing Figs.

[52] U.S. Cl. .................................................. 346/17,
346/93, 346/141
[51] Int. Cl. .................................................. G01d 9/16,
G01p 1/06

[50] Field of Search.............................................. 346/93, 80,
78, 18, 17, 141

[56] References Cited
UNITED STATES PATENTS
| 792,680 | 6/1905 | Taylor et al................ | 346/141 X |
| --- | --- | --- | --- |
| 848,329 | 3/1907 | Vawter..................... | 346/141 X |

Primary Examiner—Joseph W. Hartary
Attorney—Holman and Stern

ABSTRACT: A speed recorder for a motor vehicle is provided with a voltmeter operated by the voltage proportional to the speed of the motor vehicle. On the rotary shaft of the voltmeter is mounted a recording needle of dotting type. By means of an annular electromagnet which is actuated by a multivibrator, the supporting member of the needle is vibrated so that the needle may perform a recording operation when swung integrally with a pointer of the voltmeter.

PATENTED JUL 27 1971

Inventor
TAISUKE UCHIYAMA
By Holman, Glascock,
Downing & Seebold
Attorneys

SPEED RECORDER OF VOLTMETER TYPE FOR MOTOR VEHICLES

The present invention relates to a speed recorder of the voltmeter type for a motor vehicle. In known recorders of this type, in order to effect direct recording on a recording paper of instantaneous indication of a voltmeter which is adapted to detect the speed of a motor vehicle, electrical power of about 2 watts is generally required for the operation of the recording needle and in general such a recorder is actuated by means of a tachometer generator. Accordingly, in case the same value as the instantaneous indication of a voltmeter is to be directly recorded on the recording paper in accordance with this known system, there is a disadvantage that the power consumption is high, whereas when this operation is carried out by use of the transistor circuit, there is a need to provide a plurality of transistor circuits which inevitably results in cost increase. There is additionally another known method in which the recording needle heated by high frequency heating performs recording on a heat-sensitive recording paper, but in this method the heating device is complex and expensive.

Also known is another method in which a cam is used for conducting a mechanical dotting operation. In accordance with this method, however, the needle is so slow to dot that substantially instantaneous variations of the voltmeter can not be recorded. In addition, the cam surface wears when used over a long period of time, ans as a result a reliable recording operation can not be ensured.

An object of the present invention is to provide a speed recorder of the voltmeter type for motor vehicles which requires only very low power consumption.

Another object of the present invention is to provide a speed recorder of voltmeter type which can operate reliably over a long period with high durability and which is almost free from troubles.

Another object of the present invention is to provide a speed recorder in which pulse signals are generated by a lead switch associated with a rotary magnet disposed, for instance, in means for detecting the number of revolution number of a motor vehicle component and the electromotive force converted from the pulse signals by a digital-analog converter is utilized and which is capable of conducting accurate and precise recording over a long period of service life.

Still another object of the present invention is to simplify the structure of the device for cost reduction.

The present invention will hereinafter be described in detail with reference to the accompanying drawings illustrating a preferred embodiment thereof, in which.

Figure 1:
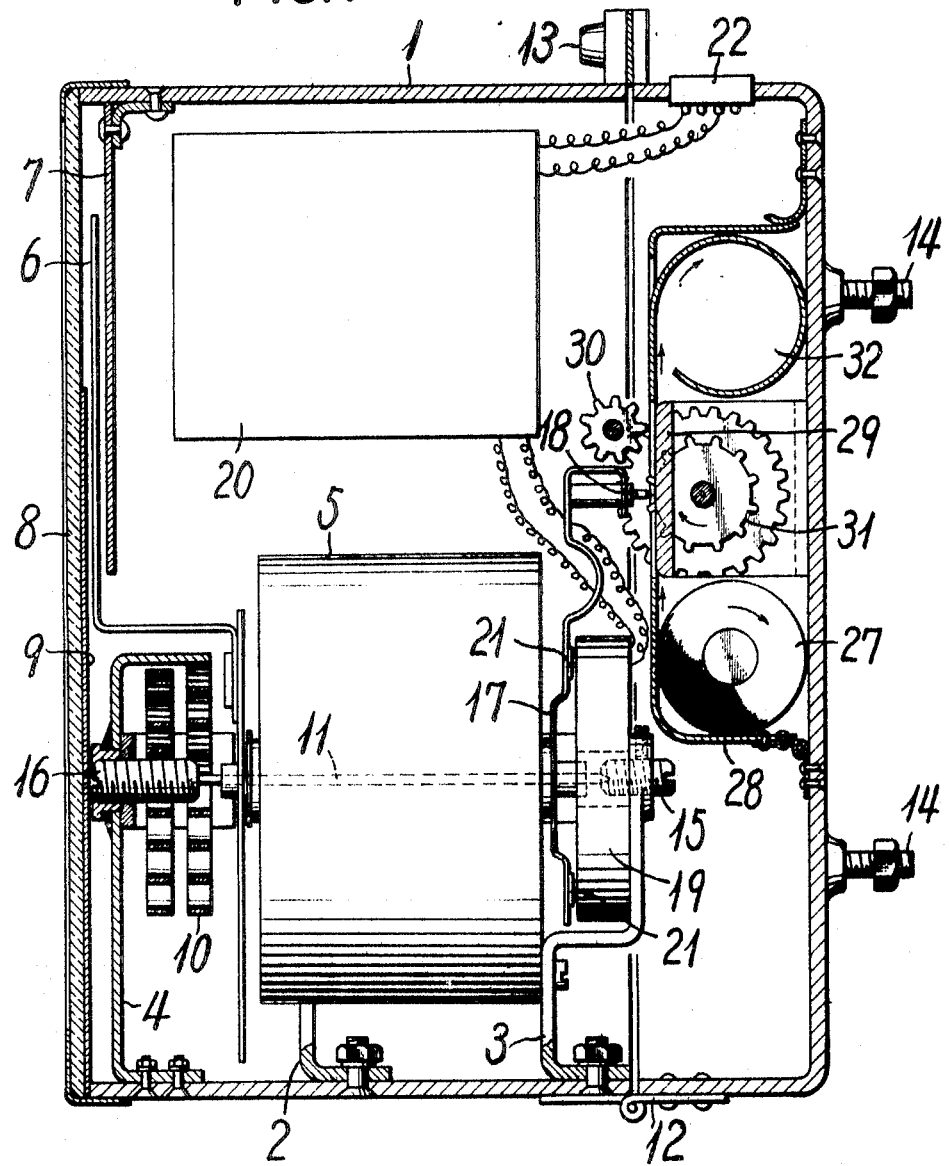
FIG. 1 is a view in section showing an example of a structure embodying the present invention.

Referring to the drawings, designated at 1 is a case or housing of a speed recorder of the voltmeter type. A voltmeter 5 is fixedly mounted inside the case by means of holding members 2, 3, 4, etc. The voltmeter 5 is operated by a voltage proportional to the speed of a motor vehicle which is supplied by a digital-analog converter to which are applied pulse signals emitted from a speed detecting means of the motor vehicle. The pointer 6 of the meter, when operated, provides an indication corresponding to the vehicle speed on a scale 7 attached to the case 1. Numeral 8 designates a transparent glass secured to the front of the case 1; 9, a cover; 10, a torsion spring for returning the pointer of voltmeter 5 to a zero position; and 11, a rotary shaft passing through the voltmeter 5 and to which adjacent one end thereof, the pointer 6 is fixed at the forward side of the voltmeter 5 As shown in FIG. 1, the rear of the case 1 is adapted to be opened and closed by means of a hinge 12 and a locking means 13. Fixed to the rear side of the case are bolts 14 for securing the device to an appropriate position in the driving compartment of the motor vehicle. The rotary shaft 11 of voltmeter 5 is supported at its opposite ends on small screws 15 and 16 screwed into the holding members 3 and 4 in adjustable manner.

By means of a supporting lever or member 17, a recording needle 18 is fixed to the rotary shaft 11 at the rear side portion of the voltmeter 5 and is preferably angularly aligned with the pointer 6, so that the pointer 6 and the recording needle 18 may be turned integrally by the rotary shaft 11. Positioned generally parallel with the supporting member 17 and spaced slightly therefrom is an annular electromagnet 19 which is supported on the holding member 3. Through a multivibrator 20, the annular electromagnet 19 is electrically connected to a suitable power source such as a battery on the motor vehicle. Provided on the supporting member 17 is an annular iron member 21 which is attracted by the annular electromagnet 19 when the latter is energized. Designated at 22 is a multipolar plug socket to be connected to the power source on the motor vehicle.

Figure 2:
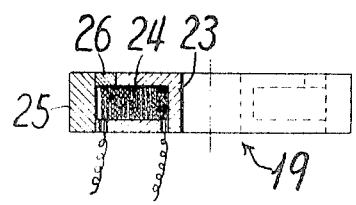
FIG. 2 is a view partly in vertical section showing the detailed structure of an annular electromagnet.
Figure 3:
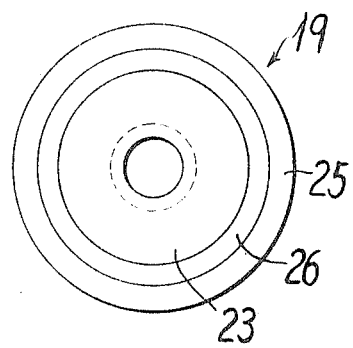
FIG. 3 is a plan view of FIG. 2.

As shown in FIGS. 2 and 3, the annular electromagnet 19 has a pure iron core 23 comprising a center cylindrical portion and a pair of radially extending disks of different diameters respectively attached to the opposite ends or faces of the cylindrical portion, the smaller diameter disk facing the annular piece 21, with a radially outwardly opening annular recessed portion formed between the disks. The recessed portion receives an enameled wire 24 wound in annular form, and the outer periphery of the larger diameter disk is fixedly fitted with an axially extending annular cylindrical sidewall 25 made of pure iron, an annular member 26 made of a nonmagnetic material such as brass being fitted into an annular space formed between the smaller diameter disk and the cylindrical wall 25. The annular iron member 21 on the supporting member 17 is positioned in front of the annular member 26.

In response to the action of the multivibrator 20, the annular electromagnet 19 repeatedly effects instantaneous magnetization and demagnetization thereby causing the recording needle 18 to vibrate constantly through the supporting member 17 for effecting the dotting operation.

Since the electrical power required for this dotting action is approximately 0.005 watt and the dotting action of the recording needle 18 can be provided by an electromagnetic vibration means which is extremely simple in structure, excess torque is not necessary for the operation of voltmeter 5 and the recording needle can record fine variations of the voltmeter accurately and rapidly with exceedingly low power consumption. Being simple in structure, the annular electromagnet and multivibrator are made available at a low cost.

The recording paper 27 for recording the dotting action of the recording needle 18 is housed in a paper holder 28 which is provided in the case 1 as shown in FIG. 1 and which is adapted to be opened and closed. By means of a feed means such as a sprocket 31 to be rotated at a constant speed by a gear 30 in a suitable drive means for feeding at a constant speed such as a timer (not shown), the recording paper is fed along a dotting plate 29 into a takeup section 32. While the recording paper 27 is being driven forward at a constant speed along the dotting plate 29, the recording needle 18 records the operation of the voltmeter 5 on the paper 27 with fidelity.

I claim:

1. A speed recorder of the voltmeter type for a motor vehicle, comprising a voltmeter adapted to be actuated by a voltage proportional to the speed of the motor vehicle and including a rotatable shaft responsive to the voltage and a pointer secured to said shaft adjacent one end thereof for rotation therewith; a dotting recording needle secured to said shaft adjacent the opposite end thereof for rotation therewith, said recording needle being angularly aligned with said pointer; an annular iron member secured to said recording needle; an annular electromagnet disposed coaxially with said annular iron member and spaced axially therefrom; and multivibrator means electrically connected to said electromagnet and adapted to intermittently energize said electromagnet, whereby said electromagnet when energized will attract said annular iron member and said recording needle secured thereto to thereby imprint an indication of the vehicle speed on a recording medium.

2. A speed recorder as defined in claim 1, wherein said annular electromagnet comprises an iron core having a center cylindrical portion and a pair of radially extending disks of different diameters respectively secured to the opposite ends of said cylindrical portion and defining a radially outwardly extending recessed portion therebetween; the smaller-diameter of said disks facing said annular iron member; an annular winding of enameled wire disposed within said recess and surrounding said cylindrical portion; an axially extending annular cylindrical iron sidewall secured to the larger-diameter of said disks and defining an annular gap between said sidewall and the smaller-diameter of said disks; and an annular brass member disposed within said annular gap, said annular brass member having a diameter substantially identical with that of said annular iron member.